United States Patent [19]
Garrett

[11] Patent Number: 5,231,953
[45] Date of Patent: Aug. 3, 1993

[54] DOG DISH APPARATUS

[76] Inventor: David S. Garrett, 1517 Cedar Ridge Dr. NE, Albuquerque, N. Mex. 87112

[21] Appl. No.: 983,389

[22] Filed: Nov. 30, 1992

[51] Int. Cl.[5] ................................. A01K 7/00
[52] U.S. Cl. ..................................... 119/61
[58] Field of Search ..................... 119/61, 73, 74; 219/432–442; 392/444–447

[56] References Cited

U.S. PATENT DOCUMENTS

| | | | |
|---|---|---|---|
| 3,076,435 | 2/1963 | Seymour | 119/61 |
| 4,599,973 | 7/1986 | Ward | 119/73 |
| 4,827,874 | 5/1989 | Mahan | 119/61 |
| 4,908,501 | 3/1990 | Arnold, III | 119/73 |
| 5,140,134 | 8/1992 | Reusche et al. | 119/73 |

Primary Examiner—Gene Mancene
Assistant Examiner—Thomas Price
Attorney, Agent, or Firm—Leon Gilden

[57] ABSTRACT

A dog dish includes a chamber in fluid separation relative to the dog dish cavity, having a temperature sensor and fluid sensor in electrical communication relative to one another having a battery member mounted therewithin for providing electrical energy and imparting stability to the dog dish structure.

3 Claims, 4 Drawing Sheets

DOG DISH APPARATUS

BACKGROUND OF THE INVENTION

1. Field of the Invention

The field of invention relates to dog dish apparatus, and more particularly pertains to a new and improved dog dish apparatus wherein the same is arranged to provide heating of fluid within the dog dish in response to fluid level and temperature within the dog dish.

2. Description of the Prior Art

Prior art such as indicated in U.S. Pat. No. 4,561,385 having water dish heaters have heretofore failed to afford the fluid sensing and association with an enlarged battery member to impart stability to the organization in use and in this respect, the present invention substantially fulfills this need.

SUMMARY OF THE INVENTION

In view of the foregoing disadvantages inherent in the known types of dog dish apparatus now present in the prior art, the present invention provides a dog dish apparatus wherein the same employs fluid and temperature sensor structure to impart electrical heating to fluids contained within associated ball cavity. As such, the general purpose of the present invention, which will be described subsequently in greater detail, is to provide a new and improved dog dish apparatus which has all the advantages of the prior art dog dish apparatus and none of the disadvantages.

To attain this, the present invention provides a dog dish including a chamber in fluid separation relative to the dog dish cavity, having a temperature sensor and fluid sensor in electrical communication relative to one another having a battery member mounted therewithin the providing electrical energy and imparting stability to the dog dish structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly form a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dog dish apparatus which has all the advantages of the prior art dog dish apparatus and none of the disadvantages.

It is another object of the present invention to provide a new and improved dog dish apparatus which may be easily and efficiently manufactured and marketed.

It is a further object of the present invention to provide a new and improved dog dish apparatus which is of a durable and reliable construction.

An even further object of the present invention is to provide a new and improved dog dish apparatus which is susceptible of a low cost of manufacture with regard to both materials and labor, and which accordingly is then susceptible of low prices of sale to the consuming public, thereby making such dog dish apparatus economically available to the buying public.

Still yet another object of the present invention is to provide a new and improved dog dish apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
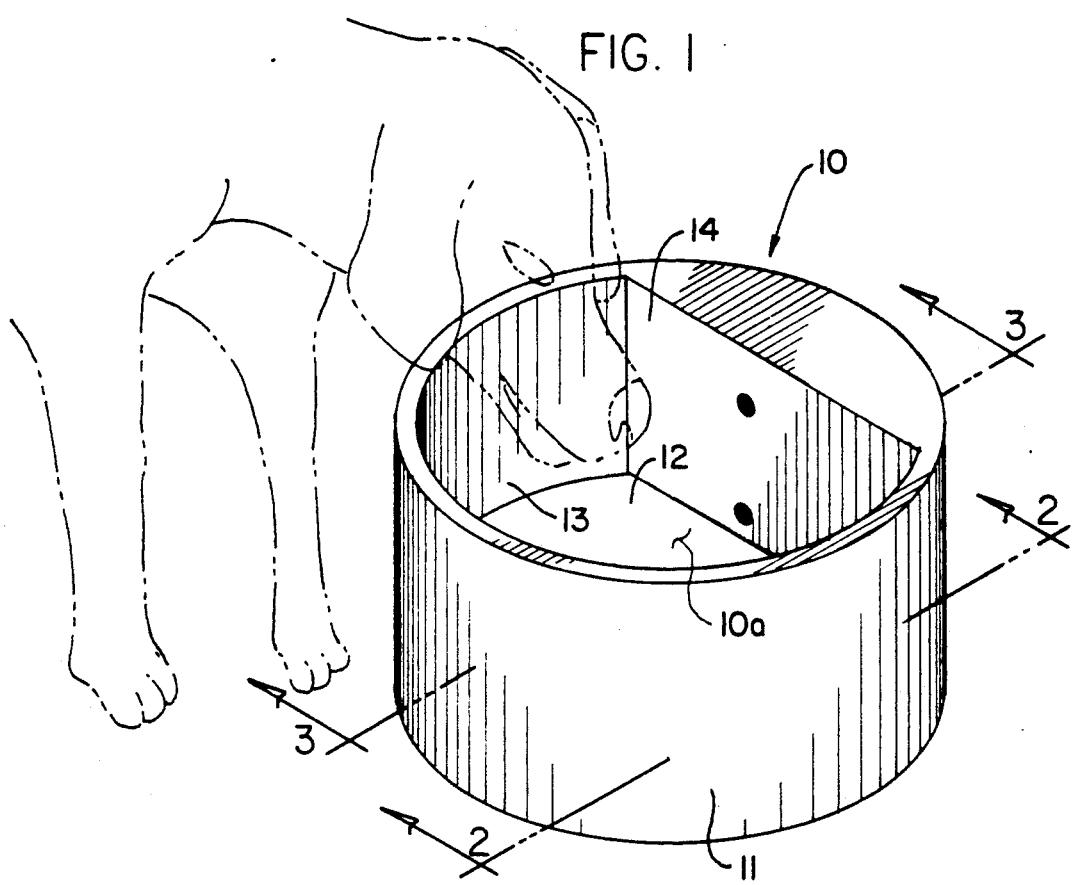
FIG. 1 is an isometric illustration of the invention.
Figure 2:
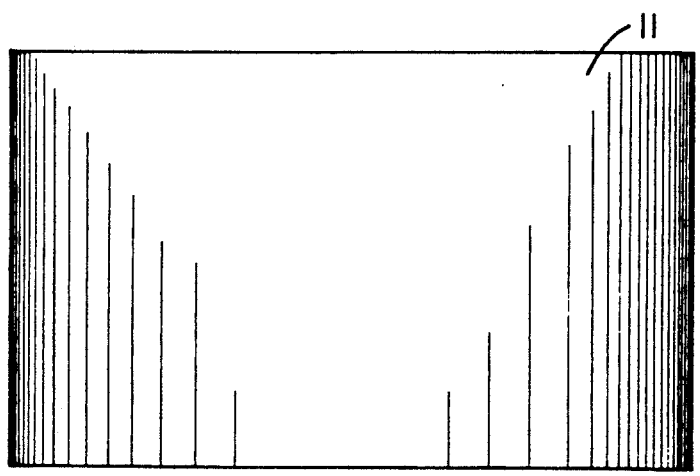
FIG. 2 is an orthographic side view of the invention, taken along the lines 2—2 of FIG. 1 in the direction indicated by the arrows.
Figure 3:
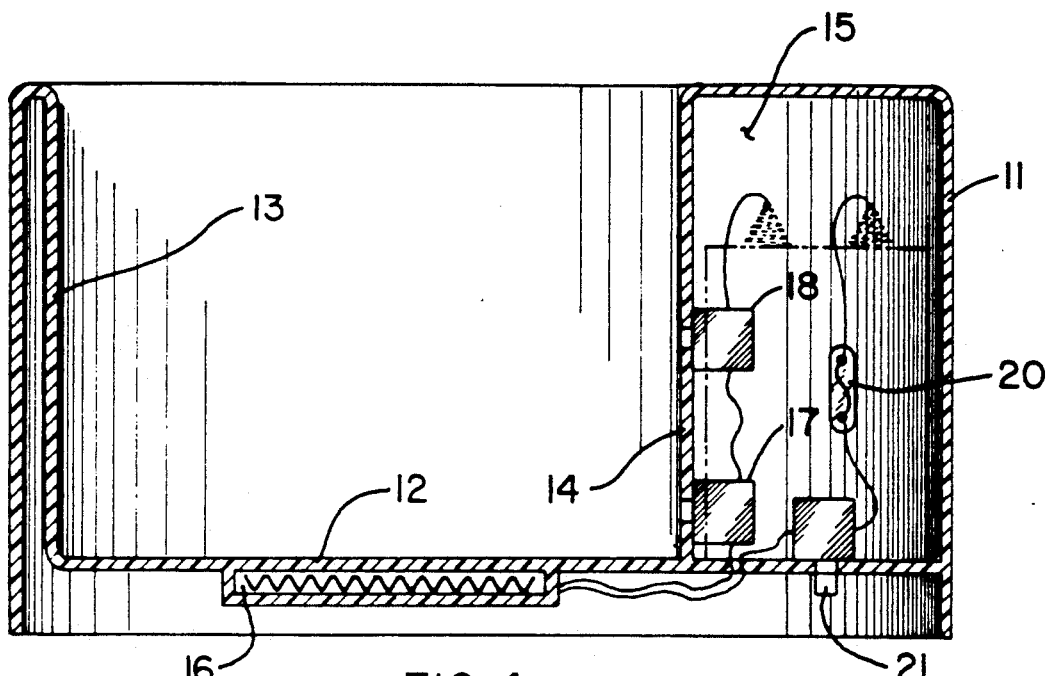
FIG. 3 is an orthographic view, taken along the lines 3—3 of FIG. 1 in the direction indicated by the arrows.
Figure 4:
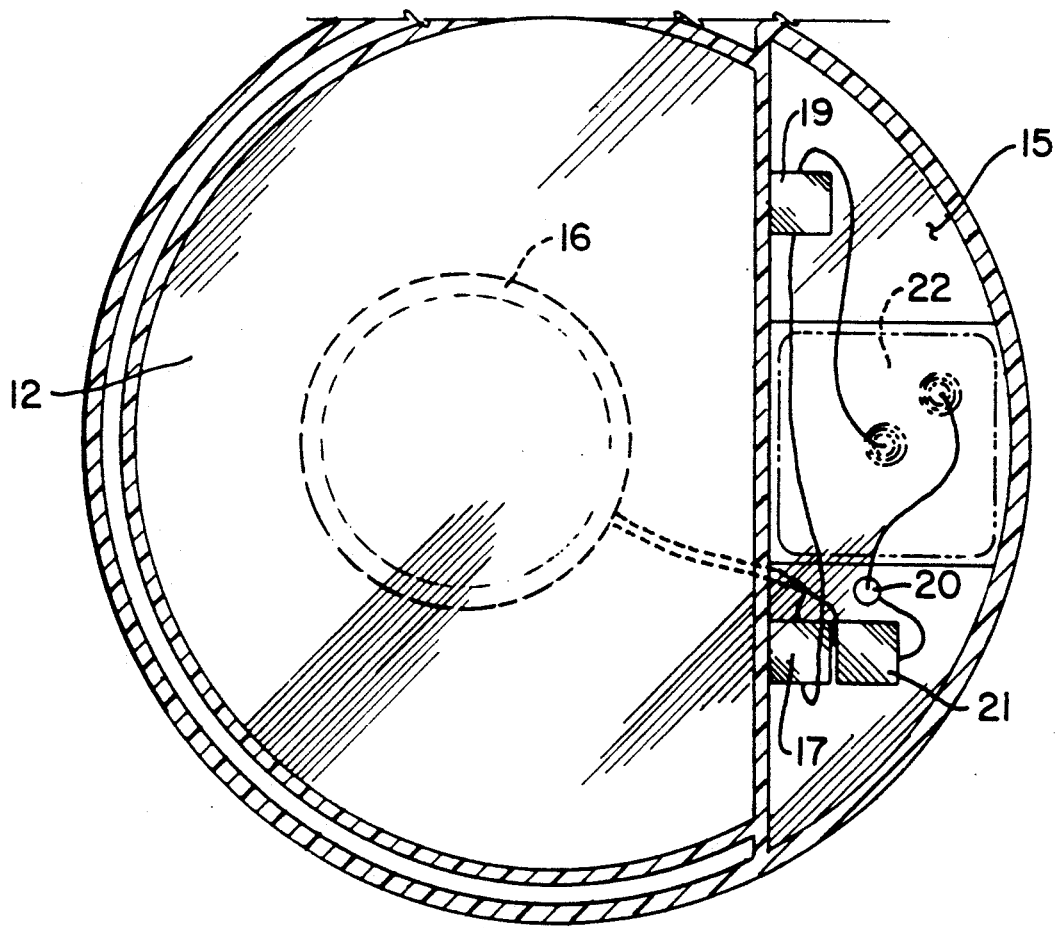
FIG. 4 is an orthographic top view in cross-section of the invention.
Figure 5:
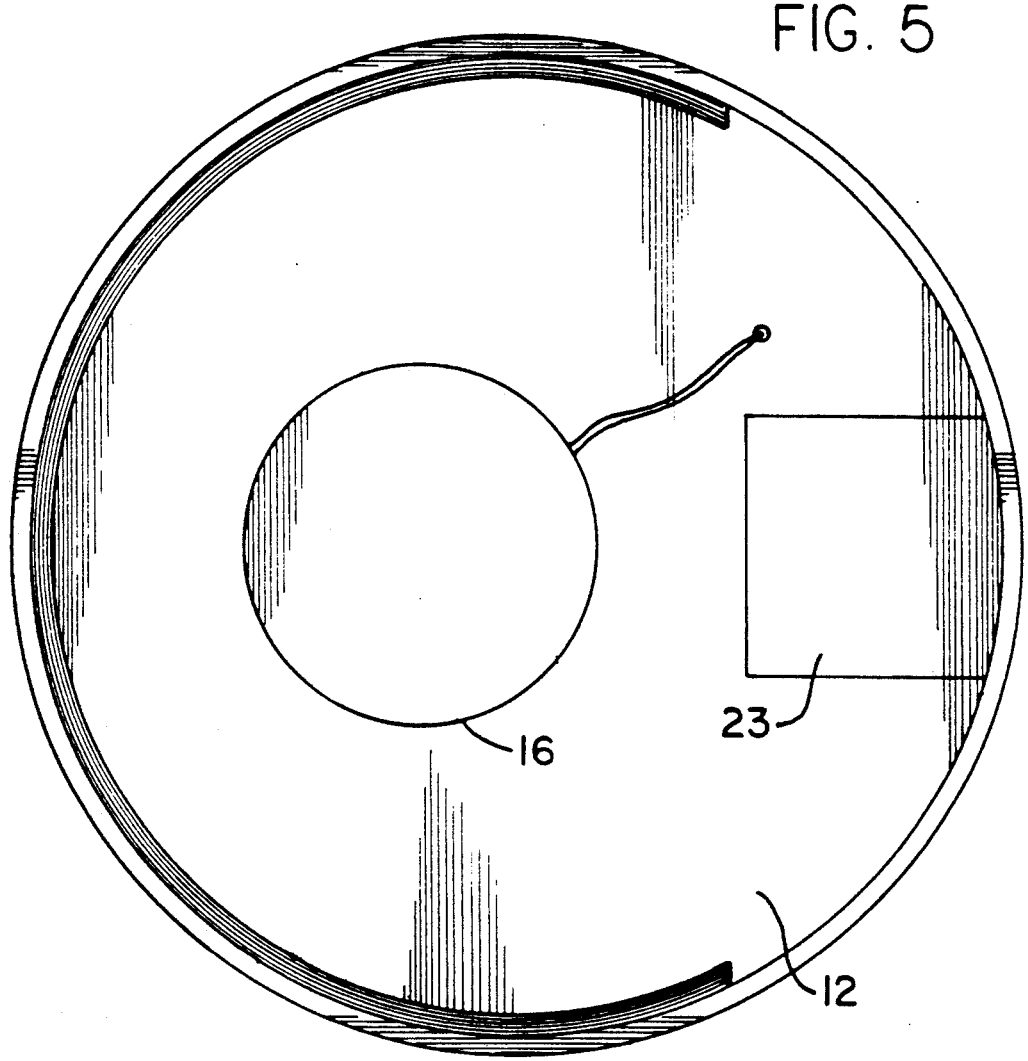
FIG. 5 is an orthographic bottom view of the dog dish structure.
Figure 6:
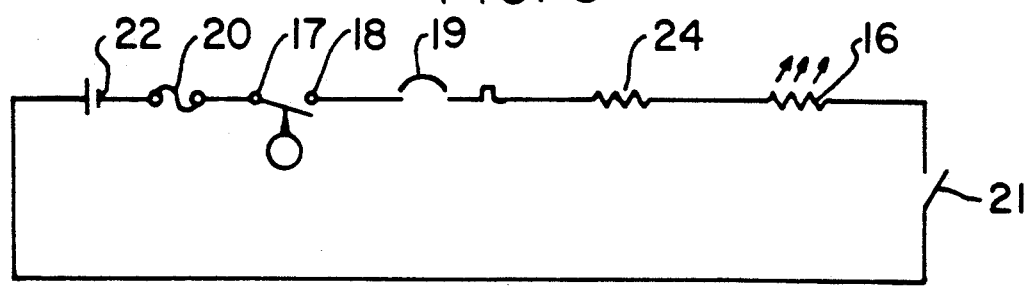
FIG. 6 is a diagrammatic electrical illustration of circuitry employed by the invention.

With reference now to the drawings, and in particular to FIGS. 1 to 8 thereof, a new and improved dog dish apparatus embodying the principles and concepts of the present invention and generally designated by the reference numeral 10 will be described.

More specifically, the dog dish apparatus 10 of the instant invention essentially comprises a bowl structure having an outer side wall 11 and a bowl cavity 10a within the dog dish apparatus positioned within an underlying floor 12, and an inner first side wall 13 in a first spacing from the outer side wall 11, and an inner second wall 14 having a second spacing from the outer wall 11 greater than the first spacing to define a compartment chamber 15 between the inner second wall 14 and the outer side wall 11. The first and second inner walls 13 and 14 form a continuous inner side wall. An electrical resistance heater 16 is mounted to the floor 12 below the floor 12, as the floor 12 is spaced above the lowermost end of the outer side wall 11. A first fluid level switch 17 projecting through the inner second wall 14 is provided, with an optional second fluid level switch 18 positioned above the first fluid level switch 17. The first and second fluid level switches 17 and 18 are arranged for cooperative relative to one another, wherein as fluid reaches the second fluid level switch 18, circuit is completed, wherein a temperature switch 19 in operative electrical communication with the first and second fluid level switches 17 and 18 and a fuse 20, as well as a battery member 22 positioned within the compartment chamber 15, provide electrical energy to the resistance heater 16. An on/off switch 21 is provided directed through the floor 12 within the compartment chamber 15. The battery member 22 is of a typical six volt type of enlarged size and weight to provide stability to the organization when mounted within the chamber. Battery door plates 23 (see FIG. 5) directed through the floor 12 provide access to the battery member 22 for its replacement and service. If required, a voltage reduction resistor 24 is provided within the circuit to regulate voltage to the electrical resistance heater 16.

Figure 8:
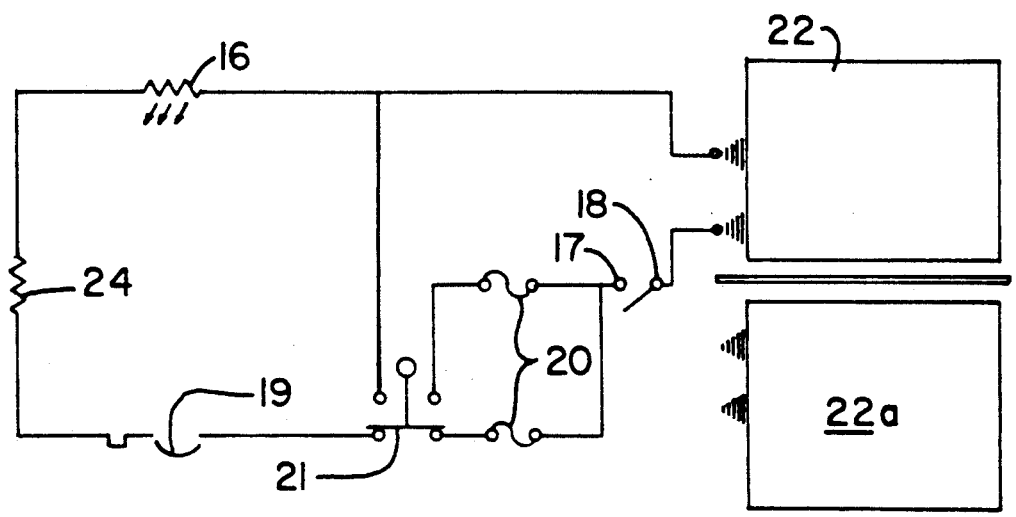
FIG. 8 is an electrical circuitry as employed by the modified structure, as indicated in FIG. 7.
Figure 7:
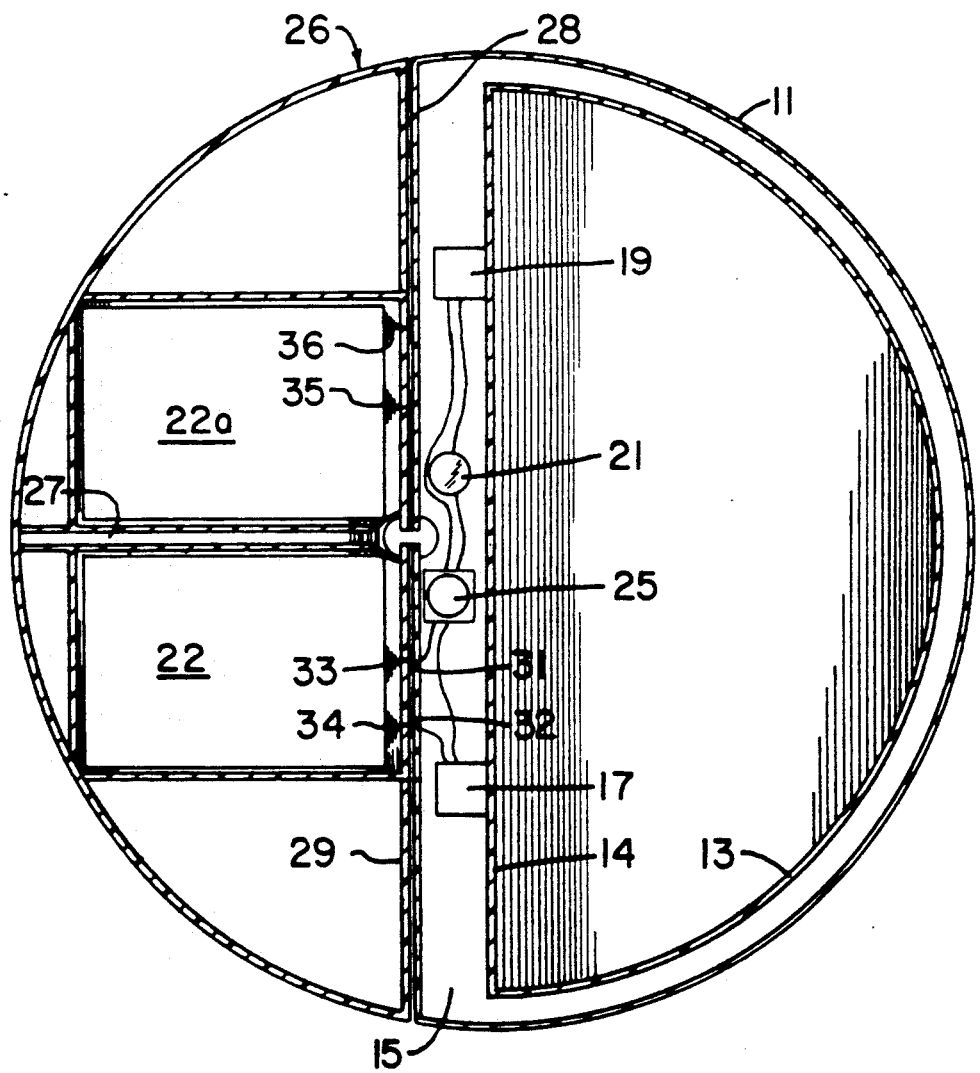
FIG. 7 is a modified battery chamber structure as utilized by the invention.

The FIGS. 7 and 8 indicates the use of a modified compartment chamber 15 having a partition wall 28 spaced from the inner second wall 14 to provide for the compartment chamber 15, with the use of a battery housing wall 29 arranged substantially coextensive with the partition wall 28 mounting the battery housing rotatably relative tot he partition wall 28. The rotatable battery housing 26 is rotatable about an axle 27 that is orthogonally and medially directed of the partition and battery housing walls 28 and 29. A first and second electrical contact 31 and 32 are fixedly mounted to the partition wall 28 for electrical communication with respective first and second electrical contacts 31 and 32 of the battery member 22. A further battery member 22a is positioned in adjacency relative to the battery member, having further battery member first and second posts 33 and 34. The battery first and second posts 35 and 36 are spaced respective first and second spacings relative to the axle 27, with the further battery first and second posts 35 and 36 spaced through respective first and second spacings relative to the axle 37 permitting rotation about the axle 27 to electrically communicate the further battery member with the first and second electrical contacts 31 and 32 upon depletion of electrical current from the battery member 22.

It should be noted should the organization desire, various features such as a low level light indicator when fluid is directed below a predetermined orientation relative to the fluid level switches 17 and 18 be illuminated to indicate reduced fluid level within the bowl cavity.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog dish apparatus, comprising, a bowl member, having a bowl cavity, with the bowl member having an outer side wall and floor, with the cavity oriented between the floor and an inner first side wall and an inner second side wall, the inner second side wall is spaced from the outside wall to provide a compartment chamber, and an electrical resistance heater mounted to the floor, with the floor positioned in a spaced relationship relative to a lowermost end of the outer side wall, and the inner second wall having at least one fluid level switch directed therethrough for detecting fluid level within the bowl cavity, and a temperature switch mounted within the compartment chamber, a fuse, and an on/off switch, and a battery member, with the battery member, the on/off switch, the fuse, and the temperature switch arranged in electrical communication relative to one another with the fluid level switch further including a partition wall spaced from and in adjacency to inner second wall, with the compartment chamber oriented between the partition wall and the inner second wall, and a battery housing wall positioned in parallel adjacency to the partition wall, with the battery housing wall and the partition wall including an axle permitting rotation of the partition wall relative to the battery housing wall.

2. An apparatus as set forth in claim 1 including a second fluid level switch, with the first fluid level switch positioned in adjacency to the floor, and the second fluid level switch directed through the inner second wall spaced above the first fluid level switch, wherein the first and second fluid level switches cooperative relative to one another for effecting heating of the electrical resistance heater upon fluid within the bowl cavity arranged in communication with the second fluid level switch.

3. An apparatus as set forth in claim 2 including a further battery member positioned in adjacency to the battery member, and the partition wall having a first electrical contact and a second electrical contact arranged in a respective first spacing and second spacing relative to the axle, and the battery member having a battery first post and a battery second post arranged and spaced from the axle the first spacing and the second spacing, and the further battery member mounted in adjacency to the battery member having a further battery first post spaced from the axle said first spacing, and the further battery having a further battery second post spaced from the axle said second spacing permitting selective electrical communication of the battery member and a further battery member relative to the first electrical contact and the second electrical contact.

* * * * *